(12) United States Patent
Schirrmacher

(10) Patent No.: US 9,831,981 B2
(45) Date of Patent: Nov. 28, 2017

(54) SERVICE SIGNAL USED AS PART OF TERRESTRIAL COMMUNICATIONS MASKING SIGNAL ON BOARD AIRCRAFT

(71) Applicant: Airbus Operations GmbH, Hamburg (DE)

(72) Inventor: Martin Schirrmacher, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 161 days.

(21) Appl. No.: 14/288,042

(22) Filed: May 27, 2014

(65) Prior Publication Data

US 2014/0364053 A1    Dec. 11, 2014

Related U.S. Application Data

(63) Continuation of application No. PCT/EP2012/073801, filed on Nov. 28, 2012.
(Continued)

(30) Foreign Application Priority Data

Nov. 29, 2011 (DE) ........................ 10 2011 119 892

(51) Int. Cl.
*H04K 3/00* (2006.01)
*H04B 7/15* (2006.01)
(Continued)

(52) U.S. Cl.
CPC ........... *H04K 3/65* (2013.01); *H04B 7/18506* (2013.01); *H04K 3/84* (2013.01); *H04L 67/12* (2013.01);
(Continued)

(58) Field of Classification Search
CPC ........ G01S 19/015; G01S 19/02; G01S 19/03; G01S 19/07; G01S 19/11; G01S 19/12;
(Continued)

(56) References Cited

U.S. PATENT DOCUMENTS

| | | | |
|---|---|---|---|
| 6,889,042 B2* | 5/2005 | Rousseau | H04B 7/18506 455/127.1 |
| 7,554,481 B2* | 6/2009 | Cohen | G01S 19/015 342/13 |

(Continued)

FOREIGN PATENT DOCUMENTS

| | | |
|---|---|---|
| DE | 102006036082 | 2/2008 |
| DE | 102008042545 | 4/2010 |

(Continued)

OTHER PUBLICATIONS

International Search Report, dated Feb. 20, 2013.
(Continued)

*Primary Examiner* — Yuwen Pan
*Assistant Examiner* — Paul P Tran
(74) *Attorney, Agent, or Firm* — Greer, Burns & Crain Ltd.

(57) ABSTRACT

A control unit for controlling wireless data transmissions in a mobile communications system provided on board an aircraft, a mobile communications system having a control unit of this type, an associated method for controlling wireless data transmissions in a mobile communications system provided on board an aircraft, and a computer program for carrying out the method. The control unit comprises a generating component for generating a band-limited masking signal for masking terrestrial mobile communications signals in a first frequency band and a combining component for combining the band-limited masking signal and a service signal for the wireless transmission of (Continued)

data in a second frequency band different from the first frequency band. The combining component is configured to combine the masking signal and the service signal so that terrestrial mobile communications signals in a third frequency band formed by overlapping of the first and the second frequency band are masked.

15 Claims, 6 Drawing Sheets

Related U.S. Application Data

(60) Provisional application No. 61/564,337, filed on Nov. 29, 2011.

(51) Int. Cl.
| | | |
|---|---|---|
| *H04W 4/00* | (2009.01) | |
| *G01S 7/36* | (2006.01) | |
| *G01S 7/42* | (2006.01) | |
| *H04B 7/185* | (2006.01) | |
| *H04W 48/02* | (2009.01) | |
| *H04L 29/08* | (2006.01) | |

(52) U.S. Cl.
CPC ........ *H04W 48/02* (2013.01); *H04K 2203/16* (2013.01); *H04K 2203/22* (2013.01)

(58) Field of Classification Search
CPC .......... G01S 19/21; G01S 19/31; G01S 19/36; G01S 19/47; H04B 7/18506; H04B 7/185; H04B 7/18502; H04B 7/18578; H04L 51/066; H04L 51/38; H04L 67/12; H04K 3/28; H04K 3/42; H04K 3/43; H04K 3/65; H04K 3/84; H04K 3/90; H04K 2203/16; H01Q 3/2617; H01Q 3/34; H01Q 21/065; H04W 16/14; H04W 48/02; H04W 84/005; H04W 92/20; H04W 84/06
USPC .......... 455/1, 11.1, 278.1, 426.1, 431, 456.4, 455/466; 342/14; 370/328, 338
See application file for complete search history.

(56) References Cited

U.S. PATENT DOCUMENTS

| | | | | |
|---|---|---|---|---|
| 7,715,853 | B1* | 5/2010 | Frerking . .......... | H04B 7/18506 370/315 |
| 8,185,040 | B2* | 5/2012 | Lauer ...................... | H01Q 1/28 455/1 |
| 8,699,404 | B2* | 4/2014 | Lynch ................ | H04B 7/18508 370/316 |
| 8,868,069 | B2* | 10/2014 | Bennett .............. | H04W 84/005 370/316 |
| 8,914,022 | B2* | 12/2014 | Kostanic ............ | H04B 7/18508 370/316 |
| 8,983,367 | B1* | 3/2015 | Fujisaki ............... | H04B 1/3822 455/13.1 |
| 2004/0142658 | A1* | 7/2004 | McKenna .............. | H01Q 1/007 455/11.1 |
| 2004/0253951 | A1* | 12/2004 | Chang ................ | H04B 7/18506 455/431 |
| 2007/0161347 | A1* | 7/2007 | Ma ...................... | H04B 7/18506 455/11.1 |
| 2007/0258417 | A1* | 11/2007 | Harvey ................. | H04W 16/14 370/338 |
| 2008/0095097 | A1* | 4/2008 | Mehta ................... | H04W 48/04 370/328 |
| 2008/0299965 | A1* | 12/2008 | Lagerman .......... | H04B 7/18506 455/431 |
| 2010/0112933 | A1 | 5/2010 | Mueller et al. | |
| 2011/0159798 | A1 | 6/2011 | Mueller et al. | |
| 2013/0029701 | A1* | 1/2013 | Cabos ................ | H04B 7/18502 455/466 |

FOREIGN PATENT DOCUMENTS

| | | |
|---|---|---|
| WO | 2010032237 | 3/2010 |
| WO | 2013013934 | 1/2013 |

OTHER PUBLICATIONS

LTE Long Term Evolution, Gutt, E, Jul. 10, 2010.
GSM on board aircraft, Carlos Gonzaga Lopez, Dec. 15, 2008.
GSM operation onbard aircraft, Cesar Gutierrez Miguelez, Jan. 2007.
Response to the ACMA.., Regulatory Development Section, Sep. 4, 2006.
Optimal subcarrier-chunk . . . , Na Gao et al., 2010.
Approval process for on-board.., ICAO-Aeronautical Communications Panel, Sep. 25, 2007.

* cited by examiner

SERVICE SIGNAL USED AS PART OF TERRESTRIAL COMMUNICATIONS MASKING SIGNAL ON BOARD AIRCRAFT

CROSS-REFERENCES TO RELATED APPLICATIONS

This application is a continuation of International Application PCT/EP2012/073801 filed Nov. 28, 2012, designating the United States and published on Jun. 6, 2013 as WO 2013/079512. This application also claims the benefit of the U.S. Provisional Application No. 61/564,337, filed on Nov. 29, 2011, and of the German patent application No. 10 2011 119 892.3, filed on Nov. 29, 2011, the entire disclosures of which are incorporated herein by way of reference.

BACKGROUND OF THE INVENTION

The present invention relates to a control unit for controlling wireless data transmissions in a mobile communications system provided on board an aircraft, to such a mobile communications system having a control unit of this type, to an associated method for controlling wireless data transmissions in a mobile communications system provided on board an aircraft, and to a computer program for carrying out the method.

To telephone on board an aircraft, mobile communications transmission systems are available which can be used during the flight by cabin crew or passengers. These are mobile communications systems which operate according to the Global System for Mobile Communications (GSM) Standard. With the aid of such a system, the aircraft crew and passengers inside the aircraft cabin can use conventional mobile terminals, such as mobile telephones, personal digital assistants (PDAs), laptops or tablet computers, for the wireless communication. An example of this is the GSM on Aircraft (GSMoA) system (also called GSM on Board (GSMoB) system) standardized by the European Telecommunications Standards Institute (ETSI). For this concept, an on-board GSM base station (also called on-board Base Transceiver Station (BTS)) connected to the terrestrial GSM network via a satellite link is provided in the aircraft. From the point of view of the terrestrial network, the on-board BTS is thus a remote, even if mobile base station. This on-board BTS supplies the on-board radio cell and thus the mobile telephones of the passengers with data from the terrestrial GSM network.

Present-day GSMoA and GSMoB systems provide GSM/GPRS (GPRS: General Packet Radio Service) services, for example, in the GSM1800 and GSM1900 frequency band for passengers and aircraft crew. In the case of GSM1800, a frequency band of 1710 MHz to 1785 MHz is available in the uplink, i.e., for data transmissions from mobile terminals to the on-board BTS, and a frequency band of 1805 MHz to 1880 MHz in the downlink, i.e., for data transmissions from the on-board BTS to the mobile terminals (for GSM1900 accordingly: 1850 MHz to 1910 MHz is available for the uplink and 1930 MHz to 1990 MHz for the downlink). These services are activated in the cruise flight phase from above 3000 meters above ground level.

In order to ensure that the mobile terminals carried (e.g., by passengers) on board connect only with the on-board base station (on-board BTS), establishment of a connection between on-board mobile terminals and terrestrial mobile communications networks (to be more precise, the base stations of the terrestrial mobile communications networks) is prevented. For this purpose, terrestrial mobile communications signals, which are necessary, inter alia, for the establishment of a connection with terrestrial base stations and are emitted from the terrestrial base stations, are masked with the aid of a masking signal (also called a screening signal). This takes places by emitting the masking signal with a predefined transmitting power in the aircraft cabin, in the respective mobile communications bands actively used on the ground, via a special unit located on board (normally called NCU (Network Control Unit) or OBCE (On-Board Control Equipment)). Normally, noise signals or noise-like signals with a bandwidth corresponding to the respective frequency band of the terrestrial mobile communications signals to be masked are used as the masking signal. If terrestrial mobile communications signals in the GSM1800 band are to be masked, the OBCE (NCU) will accordingly generate a noise signal in a frequency range from 1805 MHz to 1880 MHz, in order to mask terrestrial mobile communications signals lying in the GSM1800 downlink frequency band (i.e., signals emitted from terrestrial base stations). If additionally terrestrial mobile communications signals in the GSM900 band are also to be masked, the OBCE (NCU) will also generate in the noise signal a noise component in the GSM900 downlink frequency band (from 935 MHz to 960 MHz).

Put simply, owing to the masking signal covering the entire downlink frequency band relevant for the data transmission, the terrestrial base stations are "invisible" to the on-board mobile terminals.

For the transmission of data on board the aircraft and for establishing communication between the on-board mobile terminals and the on-board GSM base stations, GSM signals are transmitted from the on-board GSM base stations, the on-board BTSs, to the on-board mobile terminals in the downlink direction with a power level lying sufficiently above the masking signal. As a result, on the one hand, communication necessary for the wireless data transmission between the on-board BTS and the on-board mobile terminals is established and, on the other hand, the mobile terminals are prevented from communicating with terrestrial base stations.

The described systems available on board the aircraft reliably provide voice services and data services with low data rate and limited capacity. For example, with GPRS (General Packet Radio Service) maximum data rates of 54.6 kbit/s are achieved. With Enhanced Data Rates for GSM Evolution (EDGE), data rates up to a maximum of 288 kbit/s would be achieved and with the Universal Mobile Telecommunications System (UMTS) as the third generation (3G) mobile communications standard, maximum data rates of 384 kbit/s would be achieved. For multimedia applications, such as fast Internet/Intranet applications, browser-based cabin applications, new types of communication applications (e.g., Skype), audio/video on-demand applications, cabin crew communication and similar broadband applications, in some cases Wireless Local Area Network (WLAN) methods are used. However, WLAN methods do not offer the same possibilities, for example as regards authentication, billing and Quality of Service (QoS), as standard mobile communications methods.

SUMMARY OF THE INVENTION

It is an object of the present invention to provide a control unit and a method for controlling wireless data transmissions in a mobile communications system provided on board an aircraft, such a mobile communications system having a control unit of this type, and a computer program for carrying out the method, which ensure reliable use of applications of different data rates on board an aircraft.

The control unit, according to the invention, for controlling wireless data transmissions in a mobile communications system provided on board an aircraft comprises a generating component and a combining component. The generating component is configured to generate a band-limited masking signal for masking terrestrial mobile communications signals in a first frequency band. The combining component is configured to combine the band-limited masking signal and a service signal for the wireless transmission of data in a second frequency band different from the first frequency band in such a way that terrestrial mobile communications signals in a third frequency band formed by overlapping of the first and the second frequency band are masked.

In mobile communications systems, normally system information (such as system information relevant to the establishment of a connection between mobile terminals and a base station) is emitted from a base station mostly in special pilot channels, such as for example the broadcast control channel (BCCH) in the GSM system, to some or all of the mobile terminals in the range of reception of the base station. If mobile terminals can receive and decode the system information, they can establish a connection to the corresponding base station. In order to prevent the establishment of communication between on-board mobile terminals and terrestrial base stations, a masking (the masking signal) can prevent the system information of the mobile communications system from being (correctly) received and decoded by the mobile terminals. A particularly reliable masking ensures a signal which is stochastic (random) and is present in sufficient amplitude. White noise (Additive White Gaussian Noise (AWGN)) may serve as an example of such a reliable masking signal, since it is gaussianly-distributed, stochastic and therefore very effective as a source of noise (masker). AWGN usually requires relatively high energy (high power loss of the amplifiers due to high crest factors). Preferably, the signal serving for masking is not "responsive", but is always emitted (time-continuously) in the entire band. Continuous interference may, inter alia, also mean that the masking signal is emitted as a chirp signal with high repetition rate in the band concerned.

Accordingly, masking of the terrestrial mobile communications signals may be understood to mean, for example, that the terrestrial mobile communications signals which have a power level differing from zero on board the aircraft are masked by the masking signal such that the mobile terminals located on board the aircraft cannot recognize the terrestrial mobile communications signals. Establishment of a connection between mobile terminals carried on board the aircraft (on-board mobile terminals) and terrestrial base stations is thereby prevented. According to a preferred realization, the masking signal is selected such that its power level exceeds the power level of the terrestrial mobile communications signals on board the aircraft. For this purpose, the power level of the masking signal is preferably selected such that the mobile terminals cannot use the terrestrial mobile communications signals for synchronization with base stations of terrestrial mobile communications networks and thus for the establishment of a connection to these terrestrial base stations.

The terrestrial mobile communications signals can be masked in the third frequency band in particular as a result of the fact that the power level/or the power flux density, i.e., the power or the power level with regard to a specific bandwidth of the overlapping signal (resulting from combination of the masking signal and the service signal) in the third frequency band, is greater than the power level/or the power flux density, i.e., the power or the power level with regard to a specific bandwidth, of the terrestrial mobile communications signals. This prevents on-board devices from being able to connect to terrestrial base stations/to terrestrial mobile communications networks.

The mobile terminals may be terminals compatible with the LTE mobile communications standard, so-called User Equipments (UEs) or LTE UEs. These UEs are preferably also compatible with mobile communications standards of earlier generations, e.g., with mobile communications standards of the third (UMTS) and/or second generation (such as the GSM mobile communications standard).

The service signal may be any type of carrier signal which is suitable for wirelessly transmitting data in the second frequency band. In particular, it may be a time-continuous orthogonal frequency-division multiplex (OFDM) service signal with a large number of subcarriers, as used for example according to the Long Term Evolution (LTE) Standard in the downlink.

The band-limited masking signal may be any type of signal which is suitable for masking terrestrial mobile communications signals in the first frequency band. For example, it may be a time-continuous signal. It is conceivable for the generating component to be configured so as to generate the masking signal in a manner already band-limited to the range of the first frequency band (e.g., by switching off the generating component at higher frequencies). It is also conceivable for the generating component initially to generate a signal with a bandwidth greater than the first frequency band. In the latter case, this signal can be limited in the combining component to the width of the first frequency band in order to complete the masking signal.

The generating component and the combining component may be separate components arranged in a manner separated from one another in the control unit but connected to one another. Alternatively, the generating component and the combining component may be formed in a manner integrated in one another in the control unit, i.e., realized in a common unit.

The combining component is configured to combine the masking signal with the service signal. This combination is preferably effected by superimposing the two signals, to be more precise by superimposing the first frequency band (of the masking signal) and the second frequency band (of the service signal). Preferably, the first and the second frequency band are overlapped in the region of their band edges, i.e., in the region of their falling edges, in order to form a third frequency band formed from the overlapping/superimposition. In this third frequency band, terrestrial mobile communications signals are masked. The third frequency band lies in particular in the respective mobile communications bands actively used on the ground. According to a development, it is possible for the first and the second frequency band to be overlapped in such a way that in the third frequency band an at least approximately constant power level is present or that the power level occurring in the third frequency band does not fall below a predefined power level over the entire third frequency band. This predefined power level lies, for example, at a value which is at least equal to, but preferably greater than, the maximum power of terrestrial mobile communications signals which is receivable in an aircraft in cruise flight phase, i.e., usually from 3000 m altitude. In accordance with this development, it is, for example, possible for the first and the second frequency band to be overlapped at a frequency at which the maximum power level along the first and second frequency band has not dropped or dropped only as far as a predetermined value in decibels (dB).

The first frequency band may in particular be narrower than a downlink frequency band which is used in the mobile communications system arranged on board the aircraft (and with which the on-board base station is connected e.g., via satellite on the ground). For example, the first frequency band may be a subrange of the frequency band which is used on board the aircraft for the on-board mobile communications network. The second frequency band may accordingly be another subrange of the frequency band used on board the aircraft for the data transmission. The third frequency band resulting from overlapping of the first and the second frequency band may accordingly correspond at least approximately or exactly to the frequency band which is used on board for the mobile communications system. If, for example, GSM1800 is used on board the aircraft, the third frequency band may lie in a range from 1805 MHz to 1880 MHz, while the first frequency band covers a subrange of approx. 1805 MHz to approx. 1860 MHz and the second frequency band covers a subrange of approx. 1860 MHz to approx. 1880 MHz (the "approx." arises in each case due to the edges not falling ideally or not falling infinitely steeply).

The masking signal may cover, for example, not only one, but also more than one, frequency range to be masked. Accordingly, the third frequency band formed by overlapping of the first and the second frequency band can cover one or more than one frequency range separated from one another. For example, it is conceivable for the third frequency band to extend from 935 MHz to 960 MHz for masking GSM900 and from 1805 MHz to 1880 MHz for masking GSM1800. Furthermore, it is possible for the control unit to receive or determine information about the position (location) at which the aircraft is currently located and to mask one or more different frequency ranges dependent on the received or determined position. For instance, in Europe different terrestrial mobile communications frequencies are available for the data transmissions than in the USA. Accordingly, the control unit can form the third frequency band in a plurality of different frequency ranges as dependent on the position of the aircraft. If the aircraft is, for example, flying from Europe to the USA, the control unit can firstly mask the GSM900 and GSM1800 frequency bands used in Europe (and where appropriate other frequency bands used in Europe) and subsequently mask the GSM1900 frequency band used in the USA (and where appropriate other frequency bands used in the USA). In particular, the control unit may be configured to form, by combining the masking signal with the service signal, a plurality of, e.g., up to three, frequency ranges in which terrestrial mobile communications signals are to be masked. Each of these plurality of, e.g., up to three, frequency ranges may be understood in this sense as a third frequency band. Each of these up to three third frequency bands can accordingly be formed by overlapping of a first frequency band (of the masking signal) and a second frequency band (of the service signal), which then accordingly are at different frequencies.

Irrespective of how many (one, two, three, four or more than four) and which (GSM900, GSM1800, GSM1900, WCDMA2100, LTE2600) frequency ranges are to be masked by the third frequency band, only one part of the frequency range to be masked is masked by the masking signal generated by the control unit (with the aid of the first frequency band). The other part of the frequency range(s) to be masked is masked by the service signal (with the aid of the second frequency band). Put another way, the signal formed by combining the masking signal and the service signal preferably masks all of the one or more frequency ranges to be masked.

According to a first realization, the combining component may receive the masking signal band-limited to the first frequency band from the generating component and combine the service signal, supplied from outside to the combining component, with the masking signal, as described. According to a second realization, the combining component may firstly receive a masking signal generated by the generating component with a wider frequency band, limit this signal to the first frequency band and combine it with the service signal supplied from outside.

The control unit is couplable or connectable in particular to at least one first base station provided on board the aircraft (first on-board base station) and/or at least one second base station provided on board the aircraft (second on-board base station) via suitable ports. As a result, for example by means of a receiving component, the control unit can receive on-board mobile communications signals generated by the at least one first on-board base station and/or receive the service signal generated by the at least one second on-board base station. The at least one first base station may be configured in particular as a Base Transceiver Station (BTS) to generate GSM mobile communications signals and pass them on to the control unit. The at least one second base station may be, for example, an eNodeB and be configured to generate a continuous OFDM service signal and pass it on to the control unit. For example, it is conceivable for the control unit to be connected to two or more (a large number of) on-board GSM base stations (on-board BTSs) via a large number of ports which can each generate on-board GSM mobile communications signals and transmit them to mobile terminals carried on board the aircraft. Furthermore, the control unit may be connected to a single LTE base station (an eNodeB) via a port, the eNodeB generating the OFDM service signal and passing it on to the control unit. Alternatively to this, the control unit may also be connected to more than one, for example two or more, eNodeBs.

The OFDM service signal consists of a large number of subcarriers, such as for example several hundred, e.g., 600 to 1600, in particular 800 to 1400 and preferably approx. 1200, subcarriers. Owing to the continuity of the OFDM service signal (no TDMA (Time Division Multiple Access) burst operation such as with WLAN (Wireless Local Area Network)), this service signal provides good masking properties. What also contributes to the good masking properties is the fact that the large number of subcarriers of the OFDM service signal leads to noise-like properties, in particular if data are modulated on the subcarriers.

The combining component of the control unit may furthermore be configured to adapt the power level of the masking signal during flight. In particular, this adaptation may be effected automatically, taking account of the altitude of the aircraft. For example, with increasing altitude, the power level of the masking signal is increasingly reduced, i.e., the power level of the masking signal is in this case indirectly proportional to the altitude of the aircraft. Furthermore, the combining component may be configured to keep the power level of the service signal in the range of the predefined power level at least approximately constant. For example, the power level, in particular the power flux density, of the service signal can be preset to 27.5 dBm (e.g., based on 20 MHz bandwidth) and kept constant. The power level, in particular the power flux density, of the masking signal can, by contrast, be varied for example dependent on the altitude from and including 13 dBm up to and including 33 dBm (e.g., based on 75 MHz bandwidth; corresponds to −12.5 dBm to +7.5 dBm based on 200 kHz bandwidth) (to determine the power flux density, the total power over a specific bandwidth is added or integrated). Additionally or alternatively to this, the control unit may be configured, as described above, to vary the frequency range(s) to be masked dependent on the position of the aircraft.

The mobile communications system, according to the invention, for controlling wireless data transmissions is provided on board an aircraft and comprises the control unit, as is/has been described herein, at least one first on-board (provided or arranged on board the aircraft) base station for generating on-board mobile communications signals and at least one second on-board (provided or arranged on board the aircraft) base station for generating the service signal. In particular, the at least one first on-board base station is one or more on-board BTSs (e.g., micro-, pico-, femto-BTSs) for generating GSM mobile communications signals and the at least one second on-board base station is one or more on-board eNodeBs for generating the OFDM service signal.

The at least one first on-board base station is connectable preferably via a satellite link to at least one first terrestrial mobile communications network, in particular a terrestrial GSM mobile communications network, and the at least one second on-board base station is connectable, in particular via a satellite link, to at least one second terrestrial mobile communications network, in particular a terrestrial Long Term Evolution (LTE) mobile communications network, different from the first terrestrial mobile communications network. The link (connection) to the terrestrial mobile communications network is, however, not limited to satellite links, but rather other types of links are also conceivable. Mention may be made here, by way of example, of a direct link of the on-board base stations to terrestrial mobile communications networks, such as for example the direct aircraft to ground link. It is conceivable for the on-board base stations to establish connections to separate cellular ground infrastructures on exclusive frequencies or operate using the normal LTE-4G ground infrastructure with special interference management algorithms for mobile base stations. Depending on the location of the aircraft above the ground, the at least one first on-board base station and the at least one second on-board base station may establish communication, for example satellite links or direct links, with different mobile communications networks.

If the at least one second on-board base station is configured as an LTE base station (eNodeB) for generating the OFDM service signal as the service signal, this base station may furthermore be configured to modulate subcarriers of the OFDM service signal, which are not used for the wireless transmission of data, with pseudo-random payload data. It is conceivable for so-called chunks of subcarriers (i.e., related subgroups of subcarriers) to be modulated with pseudo-random payload data. Through the modulation of pseudo-random payload data into the chunks not used, it is possible, when for example there is little or no normal traffic present, for the similarity to white noise to be increased, so that the masking properties are improved.

The method, according to the invention, for controlling wireless data transmissions in a mobile communications system provided on board an aircraft comprises the following steps: generating a band-limited masking signal for masking terrestrial mobile communications signals in a first frequency band; and combining the band-limited masking signal and a service signal for the wireless transmission of data in a second frequency band different from the first frequency band, the masking signal and the service signal being combined in such a way that terrestrial mobile communications signals in a third frequency band formed by overlapping of the first and the second frequency band are masked.

A continuous signal may be used as the service signal. For example, a continuous OFDM service signal may be used as the service signal. A noise-like signal, for example, with a bandwidth corresponding to the first frequency band may be used as the band-limited masking signal. For example, a continuous white noise signal limited to the first frequency band may be used as the band-limited masking signal.

It is conceivable for the band-limited masking signal and the service signal to have in the range of the third frequency band an at least approximately equal power level (an at least equal transmitting power). The power levels of the masking signal and of the service signal in the third frequency range may, however, also differ, as long as the requirement to mask terrestrial mobile communications signals in the third frequency band is met. The first frequency band may be wider than the second frequency band. For example, a masking signal may be firstly generated in analogue fashion as in conventional GSMoA or GSMoB systems. The frequency band of this conventional masking signal is, however, for example not achieved in its full width, but has merely the smaller width of the first frequency band since, for example on generation of the masking signal, the noise generation stops at the end of the first frequency band. It is conceivable for the first frequency band to lie between 1805 MHz and 1860 MHz and thus be 55 MHz wide. Furthermore, it is conceivable for the second frequency band to lie between 1860 MHz and 1880 MHz and thus be 20 MHz wide. However, other frequency ranges are also conceivable, as described above.

According to one possible configuration of the method, on-board mobile communications signals may be transmitted from a first on-board base station, in particular a first on-board BTS, to mobile terminals located on board the aircraft, the transmitting power of the on-board mobile communications signals lying above the power level of the band-limited masking signal and, for example, also above the power level of the service signal. The prerequisite that the power level of the on-board mobile communications signals lies above the power level of the service signal is, however, for example not necessary if only on-board GSM mobile communications signals whose frequency bands lie within the first frequency band are generated by the first on-board base station. In accordance with this possible configuration of the method, data may be transmitted from a second on-board base station, in particular an on-board eNodeB, with the aid of the service signal to mobile terminals located on board the aircraft. This may takes place by modulating data on the service signal, or when using the OFDM service signal on the subcarriers of the service signal. If on-board GSM mobile communications signals emitted from the first on-board BTS are emitted with higher power than the power level of the masking signal in the first frequency band, the on-board GSM mobile communications signals are not masked, but can be received by mobile terminals.

If the OFDM service signal is used as the service signal, subcarriers not used for the wireless transmission of data may be modulated with pseudo-random payload data. According to a development, it is possible to modulate chunks of subcarriers not used for the wireless transmission of data with pseudo-random payload data.

The third frequency band may be formed by overlapping of the first frequency band and the second frequency band such that it corresponds to a standardized mobile communications frequency band, in particular a standardized downlink frequency band. Examples which may be mentioned here, without limitation thereto, are frequency bands of GSM900, GSM1800 (as described above), GSM1900, WCDMA2100, LTE2600, or digital dividends.

Furthermore, the invention relates to a computer program with program code means, which, when it is loaded in a computer or a processor (for example a microprocessor, microcontroller or digital signal processor (DSP)), or runs on a computer or processor (e.g., a microprocessor, microcontroller or DSP), causes the computer or processor (e.g., the microprocessor, microcontroller or DSP) to carry out the method described above. In addition, the invention relates to a program storage medium or computer program product having said computer program.

Even if some of the above-described aspects have been described in relation to the control unit, or the mobile communications system, these aspects may also be implemented as methods or as a computer program carrying out the method. In the same way, aspects described in relation to the method may be realized by suitable units in the control unit or the mobile communications system or be carried out by the computer program.

BRIEF DESCRIPTION OF THE DRAWINGS

Preferred embodiments of the present invention are explained below with reference to the appended schematic figures, in which.

DETAILED DESCRIPTION OF THE PREFERRED EMBODIMENTS

Hereinbelow, without being limited thereto, specific details are set out in order to provide a complete understanding of the present invention. It is, however, clear to a person skilled in the art that the present invention may be used in other embodiments which may deviate from the details set out below. Even if, by way of example, the embodiments hereinbelow are described with reference to the Global System for Mobile Communications 1800 Standard (GSM1800), the embodiments set out below are not limited thereto, but are transferable without limitation to all mobile communications frequency bands (e.g., digital dividends, GSM900, GSM1900, WCDM2100 or LTE2600), as well as other broadband mobile communications standards (e.g., WCDM, CDMA2000), and in particular to all mobile communications frequency bands and mobile communications standards, which are usable or may be used in an aircraft cabin for mobile communications. Even if further specific details are described below with reference to the Long Term Evolution (LTE) Standard, these descriptions are also transferable to standards following LTE, such as LTE Advanced.

It is clear to a person skilled in the art that the explanations set out below are/may be implemented using hardware circuits, software means or a combination thereof. The software means may be associated with programmed microprocessors or a general computer, an ASIC (application specific integrated circuit) and/or DSPs (digital signal processors). Moreover, it is clear that even if the details below are described with reference to a method, they may also be realized in a suitable device unit, a computer processor and storage connected to a processor, the storage being provided with one or more programs which carry out the method when they are executed by the processor.

Figure 1:
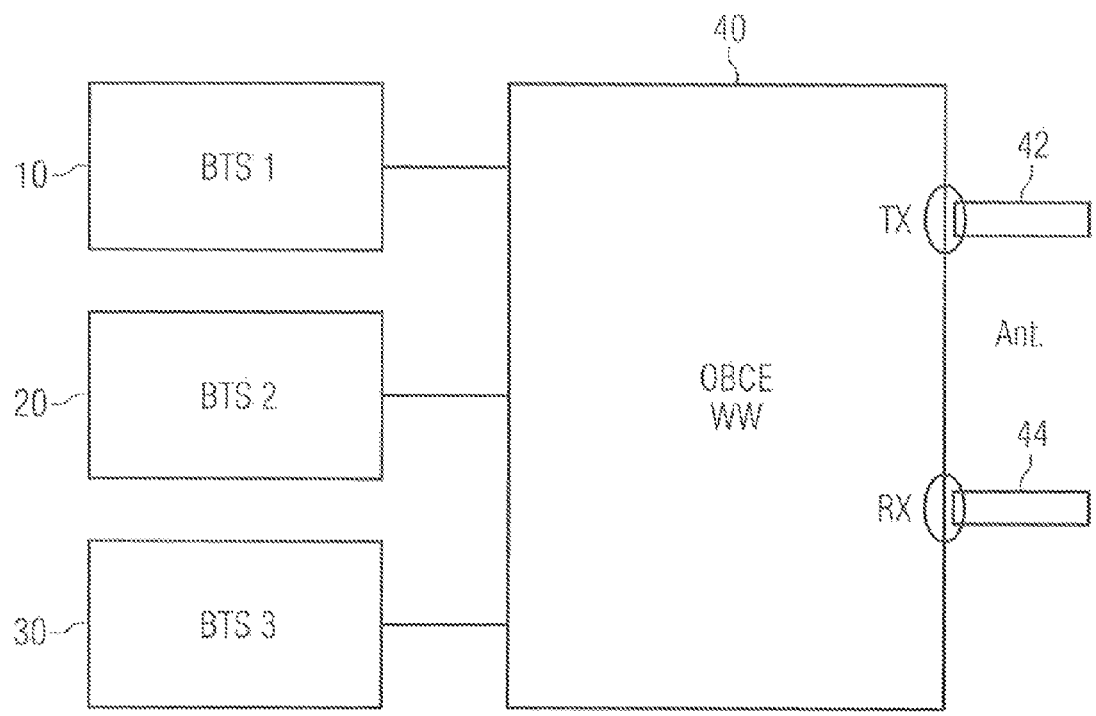
FIG. 1 shows a schematic representation of a conventional radiofrequency system architecture for GSMoB.

FIG. 1 shows schematically the system components and interconnection of present-day GSM on-board (GSMoB) systems. As can be seen in FIG. 1, three GSM base stations (called Base Transceiver Stations (BTSs) hereinbelow) 10, 20, 30 are connected to conventional OBCE (On-Board Control Equipment) 40. The OBCE is often called a Network Control Unit (NCU). In the example from FIG. 1, the BTSs 10, 20, 30 are each configured as on-board pico-BTSs (OBTSs) 10, 20, 30, which, unlike customary BTSs, are configured for supplying the relatively small cabin area of the aircraft (pico-area). Depending on the location of the aircraft, the OBTSs 10, 20, 30 can each connect to a terrestrial base station, for example via a satellite link. As a result, passengers can communicate, with the aid of mobile terminals carried on board the aircraft, with mobile terminals in terrestrial mobile communications networks via one of the OBTSs 10, 20, 30 and the satellite link. The OBCE 40 has a transmitting antenna 42 and a receiving antenna 44, which may also be configured as a shared transmitting-receiving antenna. The mode of operation of the conventional GSMoB system is explained below with reference to FIG. 2.

Figure 2:
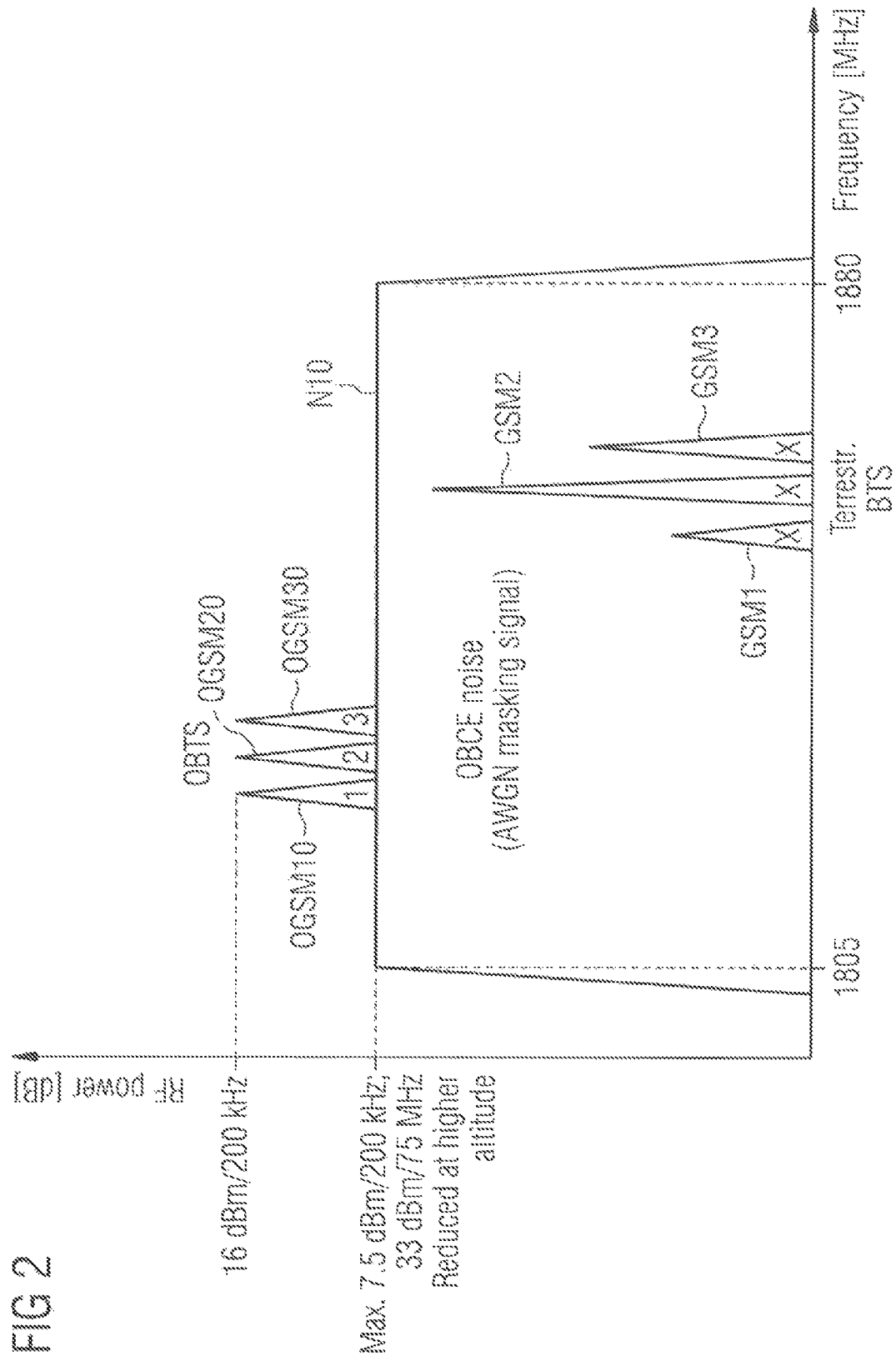
FIG. 2 shows a schematic representation of the power levels of the signals generated by the present-day system architecture according to FIG. 1 against frequency.

FIG. 2 illustrates the case in which at least one of the OBTSs 10, 20, 30 functions as a GSM1800 base station which is in communication with a terrestrial GSM1800 base station, for example via a satellite link or a direct link.

The OBCE 40 generates a noise signal N10 in a frequency range corresponding to the GSM1800 frequency band, to be more precise in the frequency range corresponding to the downlink frequency band of GSM1800 between 1805 MHz and 1880 MHz. This noise generation is activated in the cruise flight phase of the aircraft from above 3000 meters above ground level. The noise power level is adapted as a function of the altitude, i.e., the higher the aircraft flies, the lower the power level is and the lower the aircraft flies, the higher the power level is (with a maximum power level at the beginning of the cruise flight phase, i.e., at 3000 m altitude). The power level, to be more precise the power flux density (i.e., the power with regard to a specific bandwidth) of the noise signal N10 is varied according to FIG. 2 in a range from and including 13 dBm up to and including 33 dBm with regard to a bandwidth of 75 MHz (which corresponds to a range from and including −12.5 dBm up to and including +7.5 dBm in 200 kHz bandwidth). Owing to the uniform noise signal, terrestrial mobile communications signals GSM1, GSM2, GSM3, i.e., signals emitted by terrestrial BTSs, as shown in FIG. 2, are masked, since their power levels (of, for example, a maximum of or less than 7.5 dBm in 200 kHz bandwidth) lie below the power level of the noise signal N10.

Owing to this masking, mobile terminals carried on board the aircraft cannot synchronies with a terrestrial BTS and thus cannot establish communication with the terrestrial mobile communications network either. The three OBTSs 10, 20, 30 connected to the OBCE 40 emit on-board GSM mobile communications signals OGSM10, OGSM20, OGSM30 with a power level above the level of the noise signal N10. For example, as shown by way of example in FIG. 2, the on-board mobile communications signals OGSM10, OGSM20, OGSM30 can be emitted with a power level of 16 dBm (a power flux density of 16 dBm with regard to 200 kHz bandwidth) if the noise power of the noise signal N10 lies below this level. Since the on-board mobile communications signals OGSM10, OGSM20, OGSM30 lie above the noise level of the noise signal N10, mobile terminals can be synchronized with the OBTSs 10, 20, 30 and establish communication. Put another way, according to FIG. 2, it is ensured that the terrestrial mobile communications signals GSM1, GSM2, GSM3 are sufficiently masked, the on-board mobile communications signals OGSM10, OGSM20, OGSM30 can be received by the on-board mobile terminals with a sufficient level above the noise signal N10 generated by the OBCE, and the on-board mobile terminals itself can transmit with the minimum possible transmitting power (e.g., 0 dBm).

The setup shown in FIG. 1 and described with reference to FIG. 2 is, however, limited to voice applications and data applications of low data rate and not suitable for multimedia applications and other applications which require a high data rate. For example, an audio/video on-demand application as an application with a high bandwidth requires a continuous data stream of approx. 1 to 3 Mbit/s per user. These data rates are not achieved by the GSM architecture shown in FIG. 1 and described with reference to FIG. 2 even by extensions such as GPRS or EDGE, which only achieve maximum data rates up to 54.6 kbit/s and 288 kbit/s, respectively. Even 3G (UMTS) delivers only a data rate up to 384 kbit/s. However, multimedia applications of this type can be achieved with the aid of the Long Term Evolution (LTE) Standard (also called 4G). For example, 4G LTE-a with 20 MHz bandwidth provides a data rate from 14.7 Mbit/s and, depending on the reception conditions and the number of data streams (spatial streams), even data rates of more than 300 MBit/s.

The embodiments shown with reference to FIGS. 3 to 6 can be integrated into various mobile communications systems on board an aircraft. By way of example, mention may be made here of the Airline Network Architecture (ALNA; also called Onboard Mobile Telephone System (OMTS)) system. The ALNA system comprises a GSM server (HESU: Head End Server Unit; the GSM server application, for example, runs on the HESU, but additionally other applications such as, for example, the AV server can also run on it), one or more on-board pico-BTSs (OBTSs), the OBCE, a radiofrequency (RF) combiner (RFCxG2), WLAN units (WLU: WLAN Units) and a shared antenna system.

Figure 3:
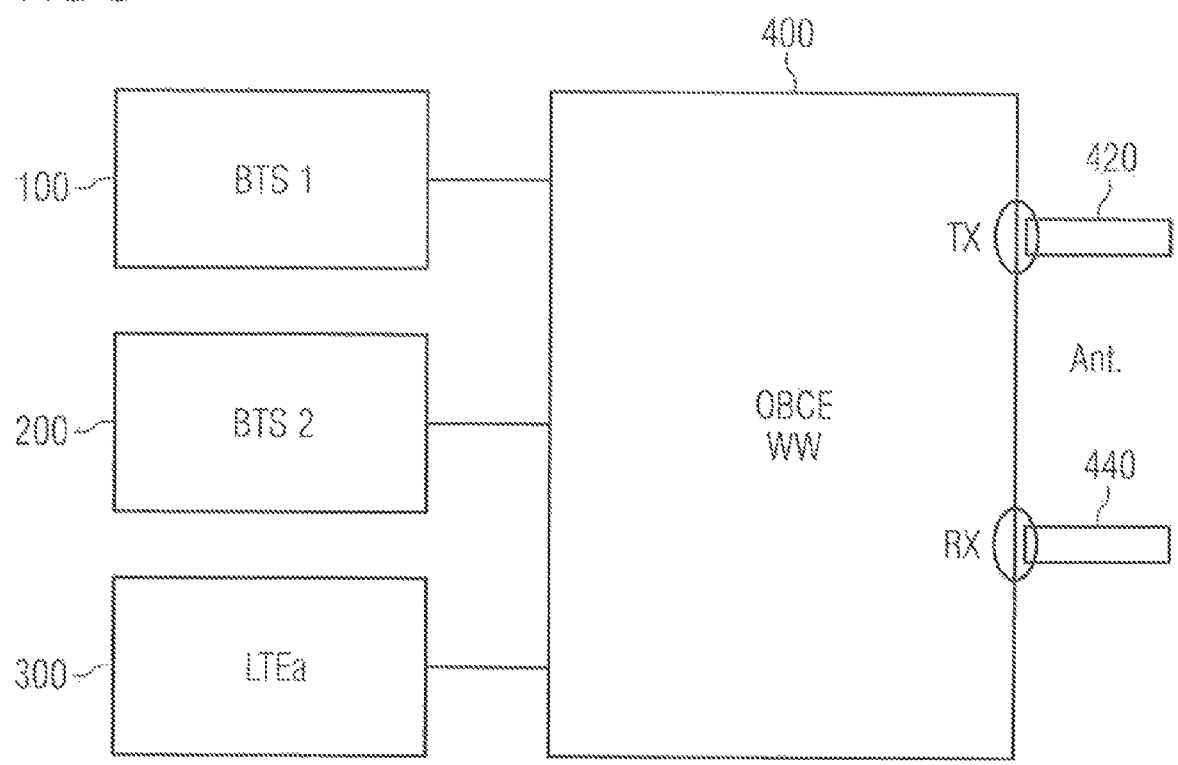
FIG. 3 shows a schematic representation of a radiofrequency system architecture according to an embodiment of the present invention.

FIG. 3 shows schematically the radiofrequency system architecture according to an embodiment of the present invention. As can be seen in FIG. 3, two BTSs (on-board BTSs) 100, 200 and an eNodeB 300 are connected to a control unit, called OBCE 400 hereinbelow. The OBCE 400 has a transmitting antenna 420 and a receiving antenna 440, but may also have a shared transmitting-receiving antenna. It is assumed hereinbelow that in the exemplary system architecture from FIG. 3 the BTSs 100, 200 are each configured as on-board pico-BTSs (OBTSs) 100, 200, which, unlike customary BTSs, are configured for supplying the relatively small cabin area of the aircraft (pico-area). Furthermore, hereinbelow it is assumed, by way of example, that in the system architecture from FIG. 3 the eNodeB 300 is configured as an on-board eNodeB 300, which, unlike customary eNodeBs, is configured for supplying the relatively small cabin area of the aircraft.

By way of example, three base stations 100, 200, 300 which are connected to the OBCE 400 via corresponding ports are shown in FIG. 3. However, the invention is not limited to this number of base stations 100, 200, 300, but rather any number of base stations 100, 200, 300 may be provided (irrespective of the type thereof, i.e., irrespective of whether they are OBTSs 100, 200 or eNodeBs 300). For example, six base stations can be connected to one or more OBCEs 400, e.g., four OBTSs and two eNodeBs.

The OBTSs 100, 200 are each configured to generate an on-board GSM mobile communications signals OGSM100, OGSM200. The two on-board GSM mobile communications signals OGSM100, OGSM200 may be in a different frequency band or in the same frequency band. Hereinbelow, without being limited thereto, it is assumed that both mobile communications signals OGSM100, OGSM200 generated by the OBTSs 100, 200 lie in the GSM1800 frequency band. The eNodeB 300 is configured to generate an LTE service signal OLTE300, i.e., an OFDM service signal OLTE300. Hereinbelow, it is assumed, by way of example, that the on-board eNodeB 300 generates such an OFDM service signal OLTE300 in an approximately 20 MHz-wide frequency band between 1860 MHz and 1880 MHz. If more than one on-board eNodeB 300, e.g., two eNodeBs, are used, the bandwidth available for LTE applications multiplies accordingly. For example, in the case of two eNodeBs, a 40 MHz-wide OFDM service signal may be available. The precise setup of the OBCE 400 according to an embodiment of the present invention is shown in FIG. 4.

The OBCE 400 has a generating component 470 and a combining component 480. Furthermore, as indicated by the dashed line, the OBCE 400 may have a separate receiving component 460 for receiving the signals emitted from the base stations (OBTSs 100, 200 and eNodeB 300). These signals may, however, also be directly led into the combining component 480 and processed there accordingly. For example, it is also possible for only the service signal OLTE300 generated by the eNodeB 300 to be directly led into the combining component 480 or be led into the combining component 480 via the receiving component 460. As can be seen furthermore in FIG. 4, the receiving component 470 is connected to the combining component 480 in such a way that the combining unit 480 can receive signals from the generating component 470. The combining component 480 is connected at least to the transmitting antenna 420, but may also additionally be connected to the receiving antenna 460.

Figure 4:
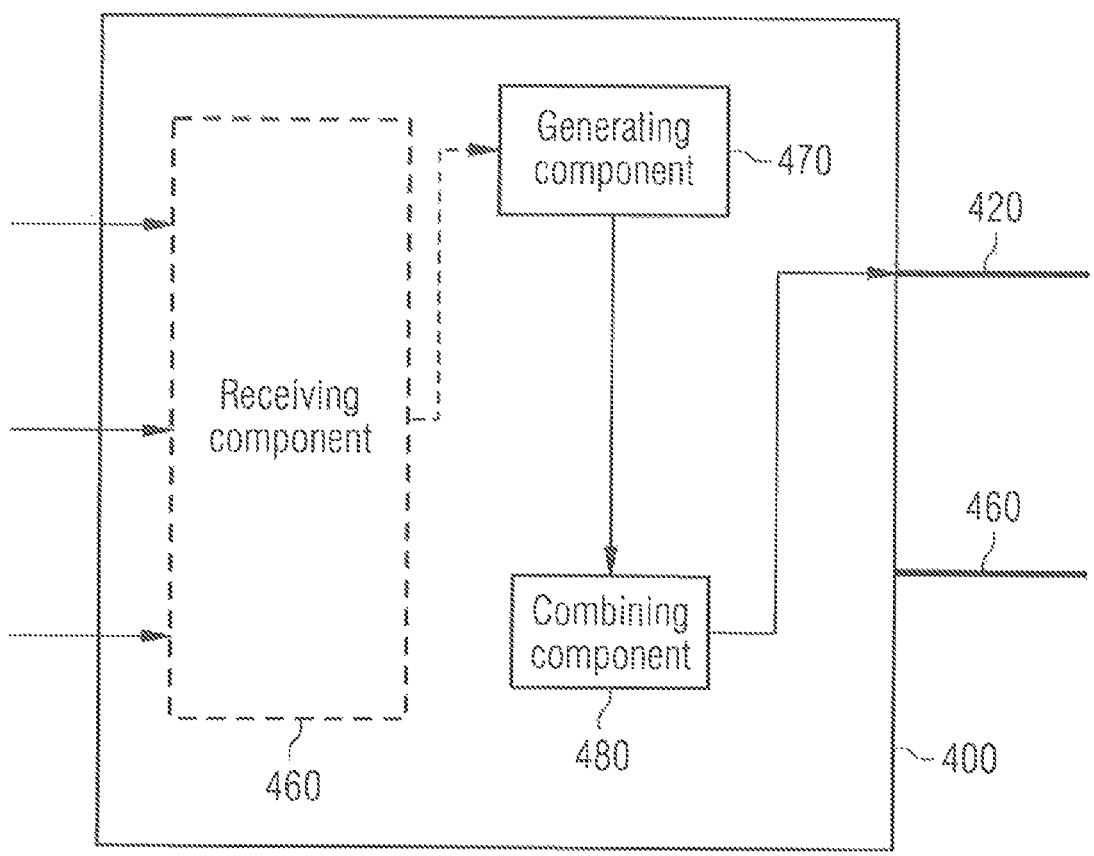
FIG. 4 shows a schematic representation of the control unit used in the system architecture according to FIG. 3, according to an embodiment of the present invention.
Figure 5:
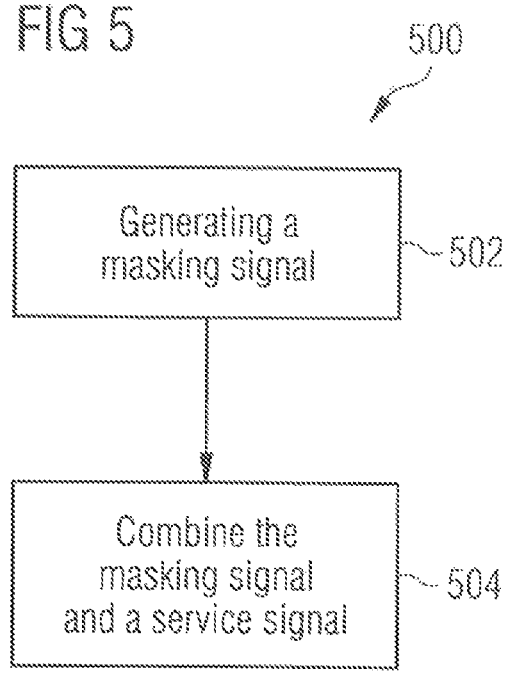
FIG. 5 shows a flow diagram of a method carried out in the system architecture according to FIG. 3, according to an embodiment of the present invention.

The mode of operation of the system architecture from FIG. 3 and the OBCE from FIG. 4 is explained in more detail with reference to FIGS. 5 and 6.

In step 502, the generating component 470 of the OBCE 400 generates a band-limited masking signal N100 for masking terrestrial mobile communications signals in a first frequency band which lies in a frequency range between 1805 MHz and 1860 MHz in the case of the GSM1800 system taken by way of example here. The masking signal N100 is a noise-like signal which is considered, by way of example, to be band-limited white noise (AWGN). In step 504, the combining component 480 combines the band-limited masking signal N100 with the service signal OLTE300 generated by the eNodeB 300 and usable for the wireless transmission of data in a second frequency band different from the first frequency band. In the case of a single eNodeB 300 taken by way of example here, the eNodeB 300 generates a 20 MHz-wide OFDM service signal, the (second) frequency band of which extends between 1860 MHz and 1880 MHz. The masking signal N100 and the service signal OLTE300 are combined in such a way by the combining component 480 that terrestrial mobile communications signals GSM1 to GSM6 in a third frequency band formed by overlapping of the first and the second frequency band are masked. Put another way, the masking signal N100 and the service signal OLTE300 are combined by the combining component 480 onto a shared antenna output (of the transmitting antenna 420). As can be seen from FIG. 6, both the power level of the masking signal N100 and the power level of the service signal OLTE300 lie above the power levels of the terrestrial GSM mobile communications signals GSM1 to GSM6 and of the terrestrial LTE mobile communications signal LTE1. The third frequency band lies between 1805 MHz and 1880 MHz in the case of the GSM1800 mobile communications system taken by way of example. It is also possible to connect more than one eNodeB 300, e.g., two eNodeBs, to the OBCE 400. In the case of two eNodeBs connected to the OBCE, the bandwidth of the LTE service signal (of the LTE service) doubles to 40 MHz, while the frequency band of the masking signal decreases to 35 MHz. More precise details of the above-mentioned steps are described with reference to FIG. 6.

Figure 6:
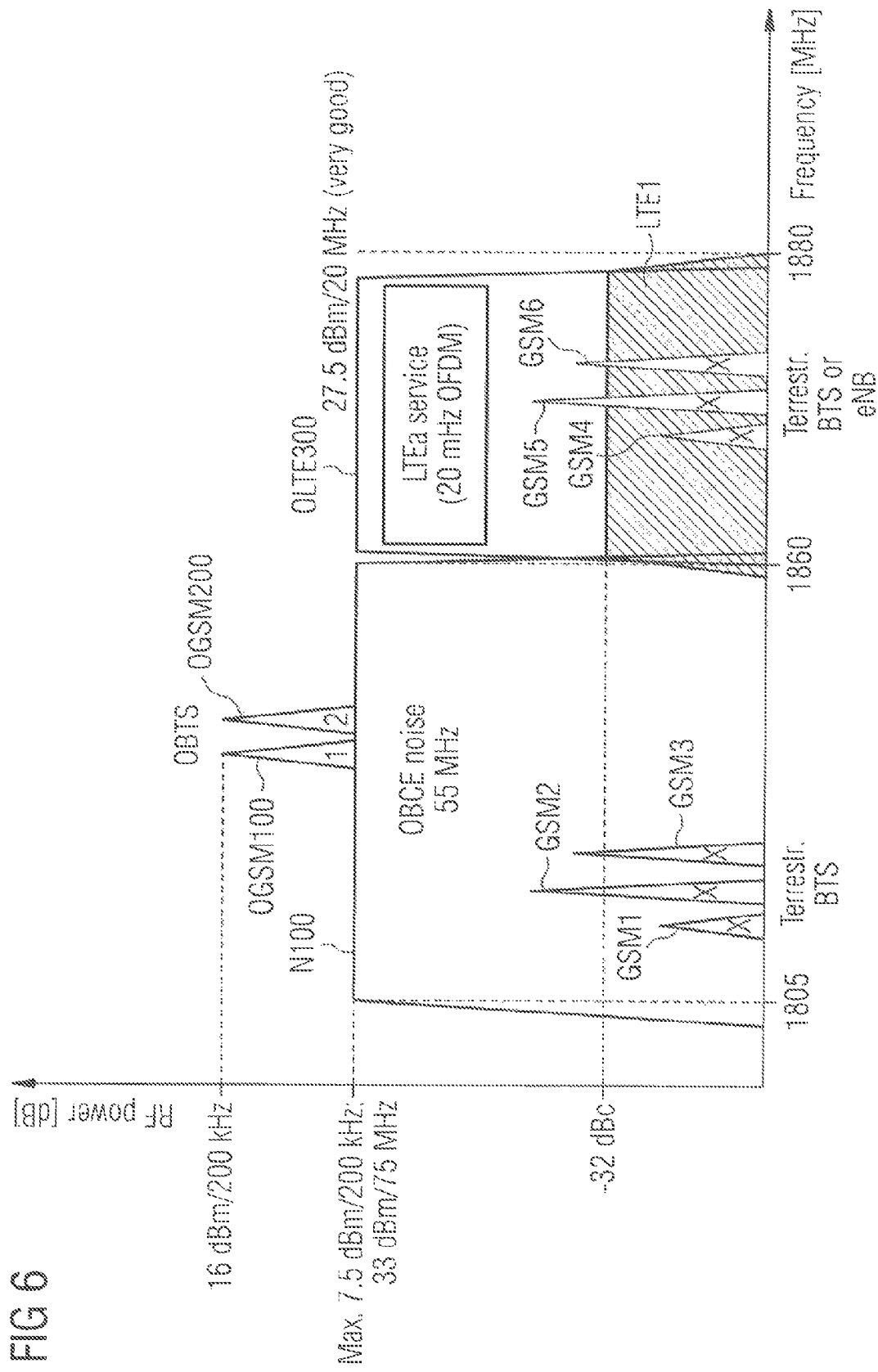
FIG. 6 shows a schematic representation of power levels of the signals generated by the system architecture from FIG. 3 and according to the method from FIG. 5 against frequency.

FIG. 6 shows the noise-like masking signal N100 in a first frequency band of 55 MHz between 1805 MHz and 1860 MHz. This masking signal N100 is considered hereinbelow, by way of example, as white noise (AWGN), but may also be any other masking signal which is suitable for masking terrestrial mobile communications signals GSM1 to GSM6, LTE1. The masking signal N100 can be emitted with different power levels, to be more precise different power flux densities, such as for example of between and including 13 dBm and 33 dBm with regard to 75 MHz bandwidth, depending on the altitude of the aircraft. In the present case, it is assumed by way of example that the masking signal N100, as described with reference to FIG. 2, is generated by the generating component 470, but the signal generator (noise generator) responsible for generating the masking signal is switched off from the frequency of 1860 MHz, so that the resulting first frequency band of the masking signal N100 is narrower than the masking signal N10 from FIG. 2.

The noise-like masking signal N100 is not used to mask the remaining part of the GSM1800 frequency band. Instead, a time-continuous service signal OLTE300 with a constant power level (the power level is, inter alia, independent of the altitude), to be more precise a constant power flux density, is used, the power level, to be more precise the power flux density, of which is, by way of example, 27.5 dBm with regard to 75 MHz bandwidth as assumed with reference to FIG. 6. In FIG. 6, for simplification, the power level of the masking signal N100 is shown as being at the same level as the power level of the service signal OLTE300, but this is mostly not the case, except at a specific altitude at which the masking signal N100 is emitted with a power of 27.5 dBm.

In the embodiment shown, the service signal OLTE300 is assumed, by way of example, to be an OFDM signal with a large number of subcarriers. The large number of subcarriers may lie in a range of several hundred subcarriers, e.g., from 800 to 1600 subcarriers, in particular 1000 to 1400 subcarriers, and preferably be approx. 1200 subcarriers. Via this service signal OLTE300, to be more precise the large number of subcarriers of the service signal OLTE300, broadband applications can be transmitted on board by the fact that data, which is to be transmitted between the eNodeB 300 and on-board LTE-capable mobile terminals (User Equipments (UEs)), are distributed over the subcarriers of the service signal OLTE300. For simplification, the large number of subcarriers of the service signal OLTE300 are not shown in FIG. 6, but rather the service signal OLTE300 is shown in a simplified manner as a signal with a constant power level. This simplification is, however, permissible and approximately correct owing to the high number of subcarriers. The properties of the OFDM service signal OLTE300, in particular its time continuity and its constant power level, reliably prevent terrestrial mobile communications signals, such as for example terrestrial GSM mobile communications signals GSM1 to GSM6 or terrestrial LTE mobile communications signals LTE1, in the third frequency band from being receivable on board the aircraft by the on-board LTE-capable mobile terminals (UEs). The continuous OFDM service signal OLTE300 through its continuity (no TDMA burst operation as in WLAN) has particularly good prerequisites as a masking signal. Moreover, as shown in FIG. 6, the OFDM service signal OLTE300 can be considered in a simplified manner as a noise signal which reliably masks terrestrial mobile communications signals in the entire frequency band of 20 MHz.

FIG. 6 shows, by way of example, six GSM mobile communications signals GSM1 to GSM6 emitted from terrestrial GSM base stations (Base Transceiver Stations (BTSs)). The terrestrial GSM mobile communications signals GSM1 to GSM6 can occur in the entire third frequency band, i.e., in the entire GSM downlink frequency band. As can be seen in FIG. 6, all these GSM mobile communications signals GSM1 to GSM6 have a maximum power level of 7.5 dBm (based on 200 kHz bandwidth), which lies below the power of the masking signal N100 and below the power of the service signal OLTE300, and for example a bandwidth of 200 kHz. Accordingly, the terrestrial GSM mobile communications signals GSM1 to GSM6 are reliably masked and the on-board UEs are unable to establish communication with the terrestrial base stations emitting the terrestrial GSM mobile communications signals GSM1 to GSM6. Furthermore, FIG. 6 shows a terrestrial LTE mobile communications signal LTE1 in the range of the second frequency band, whose power level of −32 dBc is below the service signal OLTE300. Accordingly, the terrestrial LTE mobile communications signal LTE1 is also reliably masked and the on-board UEs are unable to establish communication with the terrestrial eNodeB emitting the terrestrial LTE mobile communications signal LTE1.

The subcarriers, although they are not shown in FIG. 6 but form the service signal OLTE300, can be combined to form subcombinations of subcarriers of the OFDM service signal OLTE300, so-called chunks. If no data for transmission to the on-board UEs are present in some chunks, bit sequences whose bits each have the value 0 are modulated on the chunks. In order to increase the masking ability of the OFDM service signal OLTE300 further, according to the embodiment shown, the chunks not used for the data transmission (if there is little or no normal traffic) are modulated with pseudo-random payload data. This increases the similarity to white noise and thus the masking properties of the OFDM service signal OLTE300.

The OFDM service signal OLTE300 has the advantage of many subcarriers which are utilized adaptively, i.e., according to current radio channel requirements. This makes LTE in the downlink very robust against narrow-band interference in the band, edge interference at the band edge and echoes. The OBCE 400 is configurable. In the respectively used mobile communications band, for example up to three subbands with a granularity of 200 kilohertz and adjustable radiofrequency transmission power level can be configured. Thus, for example, it is possible for the generating component 470 of the OBCE 400 to generate three noise bands which then accordingly correspond to a standardized mobile communications frequency band (e.g., GSM900, GSM1800 and GSM1900). This ensures that the noise signal N100 (e.g., the bandwidth and the power level of the noise signal N100) can be flexibly adjusted or switched off, in order, for example, to achieve a highest possible SNR (signal-to-noise ratio) for maximum data rates.

As can be seen in FIG. 6, terrestrial mobile communications signals GSM1 to GSM6 which are emitted from GSM mobile stations (BTSs) both in the first frequency band (between 1805 and 1860 MHz) and in the second frequency band (1860 to 1880 MHz), i.e., in the entire third frequency band formed of the first and second frequency band, are reliably masked. Furthermore, terrestrial LTE mobile communications signals LTE1 in the second frequency band (and thus also in the third frequency band) are reliably masked. The on-board GSM mobile communications signals OGSM100, OGSM200, which are generated by the OBTSs 100, 200, are emitted with a power level above the power level of the masking signal (e.g., 16 dBm on 200 kHz bandwidth) for example in the first frequency band. Consequently, the on-board mobile communications signals OGSM100, OGSM200 can be received by UEs carried on board and the UEs can communicate with the OBTS 100, 200. Furthermore, the UEs can communicate with the eNodeB 300 via the service signal OLTE300.

FIGS. 3 to 6 can be summarized as follows. Firstly, the generating component 470 is configured such that it switches off the masking signal N100 in the frequency range of the OFDM service signal OLTE300, but overlaps the OFDM service signal OLTE300 to such an extent that the masking of the terrestrial GSM mobile communications signals GSM1 to GSM6 over the entire third frequency band of 1805 to 1880 MHz is ensured. Since the OFDM service signal is 20 MHz wide, but actually only 19 MHz are used for communication (500 kHz at each of the band edges serve as a guard band), there has to be an overlap between the two frequency bands (the first and the second frequency band). In the example shown, the masking signal N100 extends from 1805 MHz to 1860.4 MHz and falls steeply at the band edges (greater than 25 dB in 100 kHz).

The OFDM service signal OLTE300 with 20 MHz bandwidth is coupled (combined in the combining component 480) via one of the three ports shown of the OBCE 400 onto the GSM1800 frequency band and configured in the transmitting power to a value below the power flux density in 200 kHz bandwidth permissible by the ETSI. Typically, the transmitting power is set to the maximum possible, in order to achieve the greatest SNR in the downlink without, however, causing interference in the terrestrial base stations.

The eNodeB 300 is optionally configured such that the chunks not used for the data transmission are modulated with pseudo-random payload data, in order to make the service signal OLTE300 as similar to AWGN as possible. During the cruise flight phase, the transmitting power of the on-board eNodeB 300 is kept constant (in contrast to the OBTSs 100, 200). The LTE terminals (User Equipments (UEs)) is set at the maximum transmitting power such that it does not exceed the maximum power flux density in 200 kHz defined by ETSI, that no terrestrial networks can be disturbed, that the EMC (electromagnetic compatibility) safety requirements of the particular aircraft type are met and that a maximum possible SNR in the uplink is achieved.

Through the embodiments shown, the following advantages can be achieved. Existing mobile communications systems on board an aircraft, such as the ALNA system (OMTS; GSMoB), can be extended by a broadband multimedia-capable LTE-4G service and thus ensure that applications of higher data rates can be carried out. The signals, combined by the OBCE e.g., in the GSM1800 band and emitted, ensure that in the entire band no higher power flux density than is deemed to be permissible by ETSI is present, that terrestrial GSM signals in the entire GSM1800 band are masked and that terrestrial eNodeB signals do not cause interference (the interference level lies below the receiving threshold of the eNodeB on the ground). Furthermore, the on-board LTE signal (the LTE cabin signal) is dimensioned such that neither narrow-band GSM or broadband terrestrial LTE signals nor the partially overlapping OBCE noise signals markedly interfere with it (e.g., approx. 30 dB SNR). The solution shown can make use of the existing OBCE or its BTS ports as feeding point for the LTE-4G service signal. The LTE-4G service makes possible a series of new multimedia applications with high data rate. With the aid of the solution shown, for conventional GSM service and new LTE-4G service, depending on the traffic requirement and geographical position, accordingly three or more, e.g., six, BTS ports of the OBCE can be configured and offered. As shown, two LTE eNodeBs can also be connected to the OBCE and configured such that the LTE bandwidth increases to 40 MHz or more and accordingly the masking signal decreases to 35 MHz.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A control unit for controlling wireless data transmissions in a mobile communications system provided on board an aircraft, the control unit comprising:
    a generating component for generating a band-limited masking signal for masking terrestrial mobile communications signals in a first frequency band; and
    a combining component for combining the band-limited masking signal and a service signal for the wireless transmission of data in a second frequency band comprising a non-overlapping region which does not overlap with the first frequency band, the combining component being configured to combine the masking signal and the service signal in such a way that terrestrial mobile communications signals in a third frequency band formed by a superimposition of the first and the second frequency band are masked;
    wherein the service signal masks the second frequency band in the non-overlapping region.

2. The control unit according to claim 1, further comprising a receiving component, the receiving component being configured to receive at least one of:
    on-board mobile communications signals generated by at least one first on-board base station; and the service signal generated by at least one second on-board base station.

3. The control unit according to claim 1, the combining component being configured to at least one of:
adapt the power level of the masking signal, and
keep the power level of the service signal constant.

4. The control unit according to claim 3, wherein, when the combining component is configured to adapt the power level of the masking signal, the adaptation is dependent on the altitude of the aircraft.

5. A mobile communications system for controlling wireless data transmissions, the mobile communications system being provided on board an aircraft and comprising:
the control unit for controlling wireless data transmissions in a mobile communications system provided on board an aircraft, the control unit comprising:
a generating component for generating a band-limited masking signal for masking terrestrial mobile communications signals in a first frequency band; and
a combining component for combining the band-limited masking signal and a service signal for the wireless transmission of data in a second frequency band comprising a non-overlapping region which does not overlap with the first frequency band, the combining component being configured to combine the masking signal and the service signal in such a way that terrestrial mobile communications signals in a third frequency band formed by a superimposition of the first and the second frequency band are masked;
at least one first on-board base station; and
at least one second on-board base station;
wherein the service signal masks the second frequency band in the non-overlapping region.

6. The mobile communications system according to claim 5, the at least one first on-board base station being connectable to at least one first terrestrial mobile communications network, and the at least one second on-board base station being connectable to at least one second terrestrial mobile communications network different from the first terrestrial mobile communications network.

7. The mobile communications system according to claim 5, the at least one first on-board base station being connectable via a satellite link, to at least one first terrestrial mobile communications network, being a terrestrial GSM mobile communications network, and the at least one second on-board base station being connectable, via a satellite link, to at least one second terrestrial mobile communications network, being a terrestrial Long Term Evolution, "LTE," mobile communications network, different from the first terrestrial mobile communications network.

8. The mobile communications system according to claim 5, in which the control unit for generating the service signal generates a continuous orthogonal frequency-division multiplex, OFDM, service signal and the at least one second on-board base station is configured to modulate the OFDM service signal, in subcarriers not used for the wireless transmission of data with pseudo-random payload data.

9. A method for controlling wireless data transmissions in a mobile communications system provided on board an aircraft, the method comprising the steps:
generating a band-limited masking signal for masking terrestrial mobile communications signals in a first frequency band; and
combining the band-limited masking signal and a service signal for the wireless transmission of data in a second frequency band comprising a non-overlapping region which does not overlap with the first frequency band, the masking signal and the service signal being combined in such a way that terrestrial mobile communications signals in a third frequency band formed by a superimposition of the first and the second frequency band are masked;
wherein the service signal masks the second frequency band in the non-overlapping region.

10. The method according to claim 9, wherein at least one of:
a continuous orthogonal frequency-division multiplex, "OFDM," service signal is used as the service signal and
a continuous white noise signal is used as the band-limited masking signal.

11. The method according to claim 10, in which, on using the OFDM service signal as the service signal, the OFDM service signal is modulated, in subcarriers not used for the wireless transmission of data with pseudo-random payload data.

12. The method according to claim 9, the band-limited masking signal and the service signal being emitted in the range of the third frequency band with one of an at least approximately equal power level and a different power level.

13. The method according to claim 9, the first frequency band being wider than the second frequency band.

14. The method according to claim 9, on-board mobile communications signals being transmitted from at least one first on-board base station to mobile terminals located on board the aircraft, the transmitting power of the on-board mobile communications signals lying above the power level of at least one of the band-limited masking signal and the service signal.

15. The method according to claim 9, the third frequency band corresponding to a standardized mobile communications frequency band.

* * * * *